(12) United States Patent
Kajanoff (10) Patent No.: US 7,793,619 B2
(45) Date of Patent: Sep. 14, 2010

(54) ANIMAL GARMENT ARTICLE AND METHOD

(75) Inventor: Janice Kajanoff, Seattle, WA (US)

(73) Assignee: Zentek Clothing Company, Seattle, WA (US)

( * ) Notice: Subject to any disclaimer, the term of this patent is extended or adjusted under 35 U.S.C. 154(b) by 59 days.

(21) Appl. No.: 12/140,958

(22) Filed: Jun. 17, 2008

(65) Prior Publication Data

US 2009/0308330 A1    Dec. 17, 2009

(51) Int. Cl.
*A01K 13/00* (2006.01)
(52) U.S. Cl. .................................. 119/850; 54/79.2
(58) Field of Classification Search .............. 119/850, 119/855, 858, 863, 865; 54/79.1, 79.2, 79.4
See application file for complete search history.

(56) References Cited

U.S. PATENT DOCUMENTS

| | | | | | |
|---|---|---|---|---|---|
| 215,983 | A | * | 5/1879 | Simpson | 54/79.2 |
| 1,159,495 | A | * | 11/1915 | Hill | 54/79.2 |
| 1,595,834 | A | * | 8/1926 | Griffiths | 54/79.1 |
| 2,103,109 | A | * | 12/1937 | De Mar | 54/79.1 |
| 2,417,803 | A | * | 3/1947 | De Mar | 54/79.1 |
| 3,742,679 | A | * | 7/1973 | Jordan | 54/79.1 |
| 3,918,238 | A | * | 11/1975 | Iozzio | 54/79.2 |
| 4,355,600 | A | * | 10/1982 | Zielinski | 119/850 |
| 5,003,756 | A | * | 4/1991 | Mazzotta, Sr. | 54/79.1 |
| 5,125,519 | A | * | 6/1992 | Cambria | 211/118 |
| 5,359,963 | A | * | 11/1994 | Jesse et al. | 119/850 |
| D363,572 | S | * | 10/1995 | Obenchain | D30/145 |
| 5,463,985 | A | * | 11/1995 | Shover | 119/850 |
| 5,537,954 | A | * | 7/1996 | Beeghly et al. | 119/850 |
| 5,632,235 | A | * | 5/1997 | Larsen et al. | 119/856 |
| 5,941,199 | A | * | 8/1999 | Tamura | 119/850 |
| 6,024,055 | A | * | 2/2000 | Jesse et al. | 119/850 |
| 6,481,383 | B1 | * | 11/2002 | Ross et al. | 119/850 |
| 6,877,300 | B1 | * | 4/2005 | Hathcock | 54/79.2 |
| 7,458,339 | B1 | * | 12/2008 | Peirano | 119/815 |
| 2002/0088410 | A1 | * | 7/2002 | Burnett | 119/850 |
| 2003/0079695 | A1 | * | 5/2003 | Kerrigan | 119/858 |
| 2004/0031448 | A1 | * | 2/2004 | Trepanier | 119/850 |
| 2006/0042199 | A1 | * | 3/2006 | Donahue | 54/79.2 |
| 2007/0204808 | A1 | * | 9/2007 | Harada | 119/850 |

* cited by examiner

*Primary Examiner*—Rob Swiatek
*Assistant Examiner*—Ebony Evans
(74) *Attorney, Agent, or Firm*—Dylan O. Adams; Graybeal Jackson LLP (57) ABSTRACT

An animal garment article and method are provided herein.

13 Claims, 7 Drawing Sheets

ANIMAL GARMENT ARTICLE AND METHOD

FIELD

This invention relates generally to garments, and more specifically, to systems and methods for providing an animal garment.

BACKGROUND

Although most animals are adapted to handle common outdoor conditions, it can nonetheless be desirable to have animals wear garments. Various animal species have evolved or have been bred to be compatible with a certain type of climate, and this may not be the same climate that the animal lives in. For example, domestic animals or animals kept in a zoo may originate from a warm and dry climate such as Africa, and yet be exposed to snow and extreme cold when kept in locations that are far from the equator.

Additionally, even if an animal is physiologically adapted for cold climates, health conditions or modifications to an animal's fur may make these specific animals susceptible to cold and wet conditions. Moreover, it is not safe or comfortable for most animals to be exposed to rain and/or snow for prolonged periods and an animal garment can provide protection in such situations.

Providing clothing for pets and animals dates back to at least 520 A.D. in Great Britain, when dogs were dressed in clothing for the amusement of their owners. Horses also wore clothing for both esthetic and functional reasons, such as to protect them against cold and in case of an attack. Today, pets and animals of all species wear clothing for various reasons, although existing animal garments are deficient in many ways.

First, many animal garments are designed to mimic clothing worn by humans; however, the anatomy and physiology of many animals, especially quadrupeds or tetrapods, creates range of motion, mobility, and comfort issues that are not address by current animal garments. Additionally, many animal garments are not configured to allow both protection from the elements and temperature control for the animal.

BRIEF DESCRIPTION OF THE DRAWINGS

The present invention will be described by way of exemplary embodiments but not limitations, illustrated in the accompanying drawings in which like references denote similar elements, and in which.

DESCRIPTION

Illustrative embodiments presented herein include, but are not limited to, systems and methods for providing an animal garment.

Various aspects of the illustrative embodiments will be described using terms commonly employed by those skilled in the art to convey the substance of their work to others skilled in the art. However, it will be apparent to those skilled in the art that the embodiments described herein may be practiced with only some of the described aspects. For purposes of explanation, specific numbers, materials and configurations are set forth in order to provide a thorough understanding of the illustrative embodiments. However, it will be apparent to one skilled in the art that the embodiments described herein may be practiced without the specific details. In other instances, well-known features are omitted or simplified in order to not obscure the illustrative embodiments.

Further, various operations will be described as multiple discrete operations, in turn, in a manner that is most helpful in understanding the embodiments described herein; however, the order of description should not be construed as to imply that these operations are necessarily order dependent. In particular, these operations need not be performed in the order of presentation.

The phrase "in one embodiment" is used repeatedly. The phrase generally does not refer to the same embodiment; however, it may. The terms "comprising," "having" and "including" are synonymous, unless the context dictates otherwise.

The following Figures depict exemplary systems and methods for providing an animal garment 100. In various embodiments, the animal garment 100 can comprise an extended portion to cover an animal 105, when the animal garment 100 is worn by the animal 105. Additionally, in various embodiments, the animal garment 100 may further comprise one or more front leg and/or chest insert 110, 115, which may be a portion of stretchable material that is configured to provide improved range of motion for an animal 105 wearing the animal garment 100. In other embodiments, the animal garment 100 may comprise a chest halter portion 135 that comprises coupling arms 125A, 125B, which may be coupled at a top portion of the animal garment 100. For example, in some embodiments, the coupling arms 125A, 125B may be coupled to each other, and in other embodiments the coupling arms 125A, 125B may be coupled to a portion of the animal garment 100 or an extension thereof.

Figure 1:
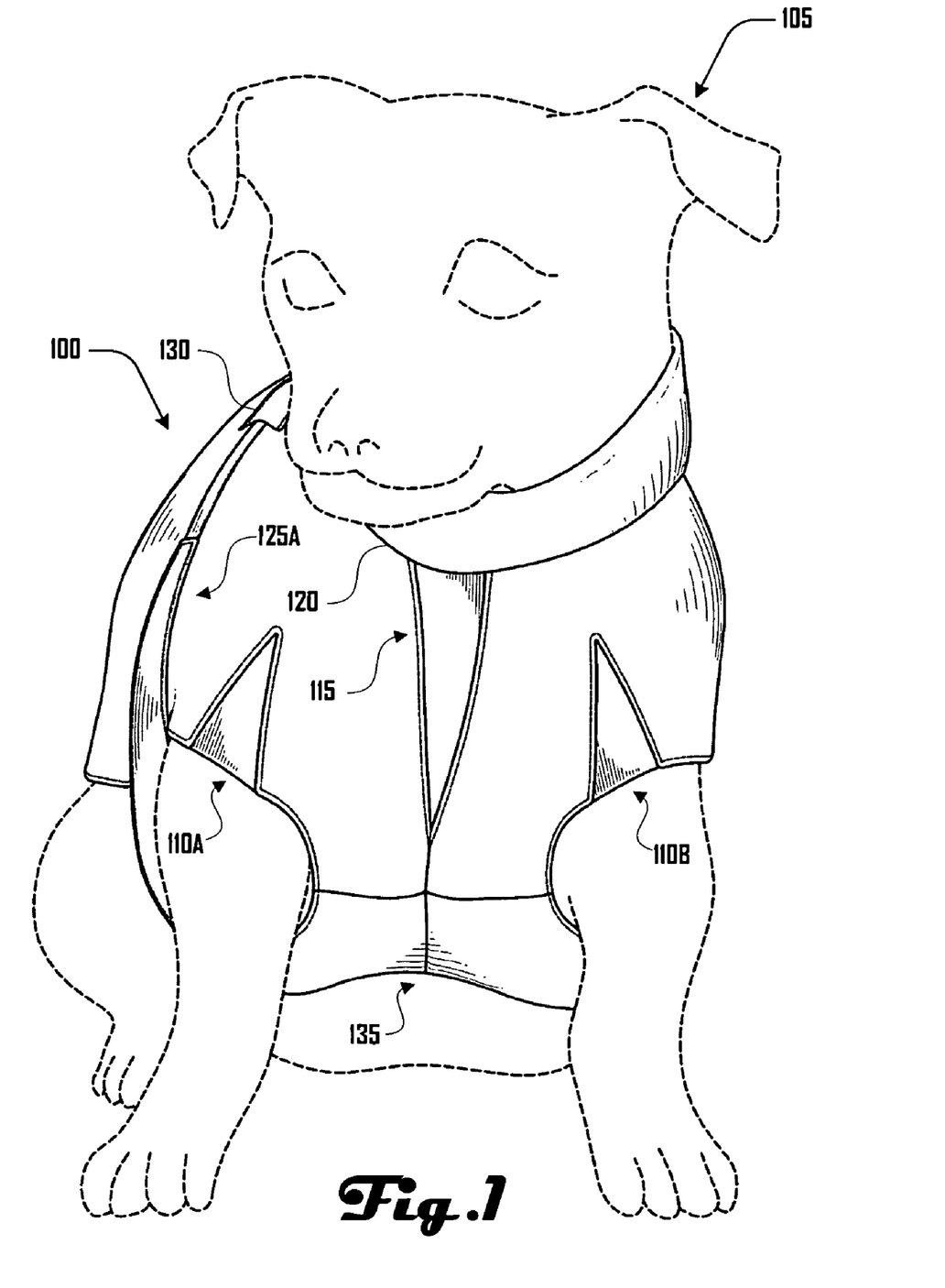
FIG. 1 is a front view of an animal wearing an animal garment, in accordance with various embodiments.

FIG. 1 depicts an animal garment 100 being worn by an animal 105. The animal garment 100 comprises a first and second front leg insert 110A, 110B, a chest insert 115, a collar 120, a coupling slot 130, and a chest halter portion 135. The chest halter portion 135 comprises at least one coupling arm 125. Various embodiments depicted herein illustrate embodiments wherein the animal 105 wearing the animal garment 100 is a dog; however, a dog is used only for illustrative purposes, and in some embodiments, an animal garment 100 may be configured for other animals, which may include cattle, reindeer, goats, pigs, horses, sheep, various species of fowl or birds, cats, guinea pigs, rabbits, various rodents, llamas, oxen, ferrets, dolphins, donkeys, whales, seals, monkeys, apes, giraffes, zebra, and the like. In other embodiments, the animal garment 100 may be configured for or worn by a human.

As depicted in FIG. 1, the animal garment 100 comprises a first and second front leg insert 110A, 110B. The first and second front leg insert 110A, 110B may be various types of stretchable material and may be coupled or sewn within open or closed slits defined by the substantially non-stretchable body of the animal garment 100. In some embodiments, the slits can be defined by an open or closed opening, cut or slit in a single panel of fabric or material, or can be defined by the junction between two or more panels of fabric or material.

In various embodiments, the first and second front leg insert 110A, 110B may be configured such that when the animal garment 100 is worn, the first and second front leg insert 110A, 110B allow for stretching of the animal garment 100 about and around the legs of the animal 105 wearing the animal garment 100.

For example, FIG. 1 depicts an animal 105 with front legs extending through orifices defined by the animal garment 100. The first and second front leg insert 110A, 110B are positioned such that when the animal 105 walks, lays down, or otherwise moves it's front legs, the first and second front leg insert 110A, 110B may stretch and thereby allow the animal garment 100 to flex, expand, or move to accommodate movement of the front legs with reduced interference, encumbrance, or impediment from the animal garment 100. Additionally, the first and second front leg insert 110A, 110B may provide for greater range of motion, while also allowing the animal garment 100 to snugly fit the form of a wearing animal 105. Accordingly, in various embodiments, it may be desirable to configure a first and second front leg insert 110A, 110B such that a wearing animal 105 is provided with increased range of motion while also providing for a snug fit of the animal garment 100.

Similarly, the animal garment 100 may also comprise a chest insert 115, which may be a stretchable body coupled or sewn within an open or closed slit defined by the animal garment 100. In various embodiments, the chest insert 115 may be configured or positioned such that when the animal garment 100 is worn, the animal garment 100 is positioned about or around the chest area of the animal 105. In various embodiments, the chest insert 115 is configured to allow expansion and/or contraction to occur in some areas of the animal garment 100 to provide for improved mobility and range of motion for a dog 105 wearing an animal garment 100. Additionally, in other embodiments, the chest insert 115 may be configured to provide a snug fit of the animal garment 100 while also providing for improved range of motion and comfort of a dog wearing the animal garment 100.

In various embodiments, there may be one or more chest insert 115, front leg insert 110A, 110B, or a similar insert located in various locations on or about the animal garment 100. In some embodiments, it may be desirable to provide stretchable inserts in locations on an animal garment 100 such that an animal 105 wearing the animal garment 100 has improved range of motion and comfort while wearing the animal garment 100. For example, in various embodiments, stretchable inserts may be positioned in relation to the anatomy, physiology, biomechanics and/or motor learning of an animal 105. In one embodiment, there can be a stretchable neck insert on or about the collar 120.

Additionally, the animal garment 100 may comprise a collar 120. In some embodiments, the collar 120 may be an orifice defined by the animal garment 100 that is configured to be positioned around the neck of an animal 105. In some embodiments, the collar 120 may be an extended body that covers some or all of the neck of an animal 105, or that may cover the head of an animal 105. In one embodiment, the collar 120 is configurable to be folded about itself to change the length of the collar 120. For example, in one embodiment, an extended collar 120 may be folded such that the collar 120 only covers a portion of the animal's 105 neck, and the collar 120 may be un-folded to cover a further portion of the animal's 150 neck or to cover a portion of the animal's 105 head. In one embodiment, the collar 120 may comprise one or more layers or be configured to provide neck protection for an animal 105. In another embodiment, the collar 120 can be configured to be a hood and thereby cover some or all of the head of an animal 105 when the hood is worn. In some embodiments, the hood can be extendable and retractable.

The animal garment 100 also may comprise a chest halter portion 135, which comprises one or more coupling arm 125A. The one or more coupling arm 125A may be coupled within a coupling slot 130 in various embodiments. Various embodiments comprising coupling arms 125A, 125B are further shown and described herein.

Figure 2:
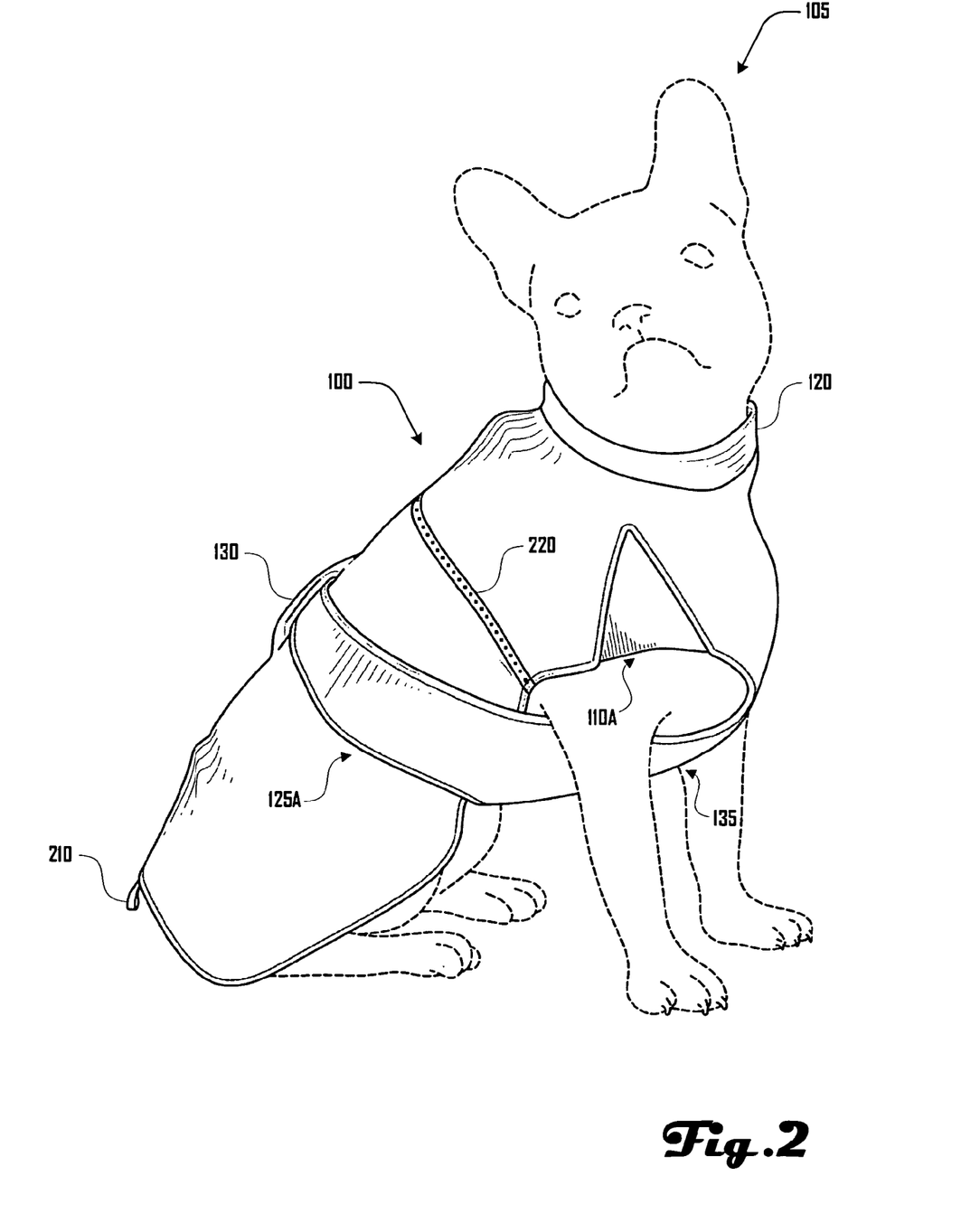
FIG. 2 is a side view of an animal wearing an animal garment, in accordance with various embodiments.

FIG. 2 is a side view of an animal 105 wearing an animal garment 100, in accordance with various embodiments. The animal garment 100 comprises a front leg insert 110A, a collar 120, a coupling slot 130, a chest halter portion 135, a hanging loop 210, and a reflective strip 220. The chest halter portion 135 comprises at least one coupling arm 125 that may be coupled within the coupling slot 130. Additionally, the animal garment 100 may comprise an extended portion that may cover a portion of an animal 105, when the animal garment 100 is worn by the animal 105

As described herein, the animal garment 100 may comprise one or more front leg insert 110A that may be a stretchable material that is sewn into a substantially non-stretchable body of the animal garment 100. Additionally, the animal garment 100 may comprise one or more reflective strip 220 that may be positioned, coupled, or sewn into various locations on the animal garment 100.

The animal garment 100 also comprises a chest halter portion 135, which comprises one or more coupling arm 125. The chest halter portion 135 of the animal garment 100 may cover a bottom portion of an animal 105 when the animal 105 is wearing the animal garment 100 and may be configurable to secure the animal garment 100 to the animal 105. In various embodiments, one or more coupling arm 125 may extend from the chest halter portion 135 which may be coupled to another portion of the animal garment 100, another coupling arm 125, or the like. For example, in one embodiment, the chest halter portion 135 comprises two coupling arms 125 that extend therefrom, that may be coupled to each other within a coupling slot 130 on a top portion of the animal garment 100. In various embodiments, the coupling slot 130 may be defined by a length of material that defines a slot, hole or orifice in which one or more coupling arm 125 may be coupled to one another, or to another portion of the animal garment 100.

The animal garment 100 further comprises a hanging loop 210, which as depicted in FIG. 2, may reside on a rear portion of the animal garment 100. In various embodiments, the handing loop may be a length of material coupled to the animal garment 100 such that a loop or orifice is defined by the hanging loop 210. In further embodiments, the hanging loop 210 may be various configurations and may be made of various materials or structures. In one embodiment, there may be a plurality of hanging loops 210. The hanging loop 210 may be used to hang the animal garment 100 when the animal garment 100 is not being worn by an animal 105; however, in various embodiments, the hanging loop 210 may be used for other functions or purposes.

Figure 3:
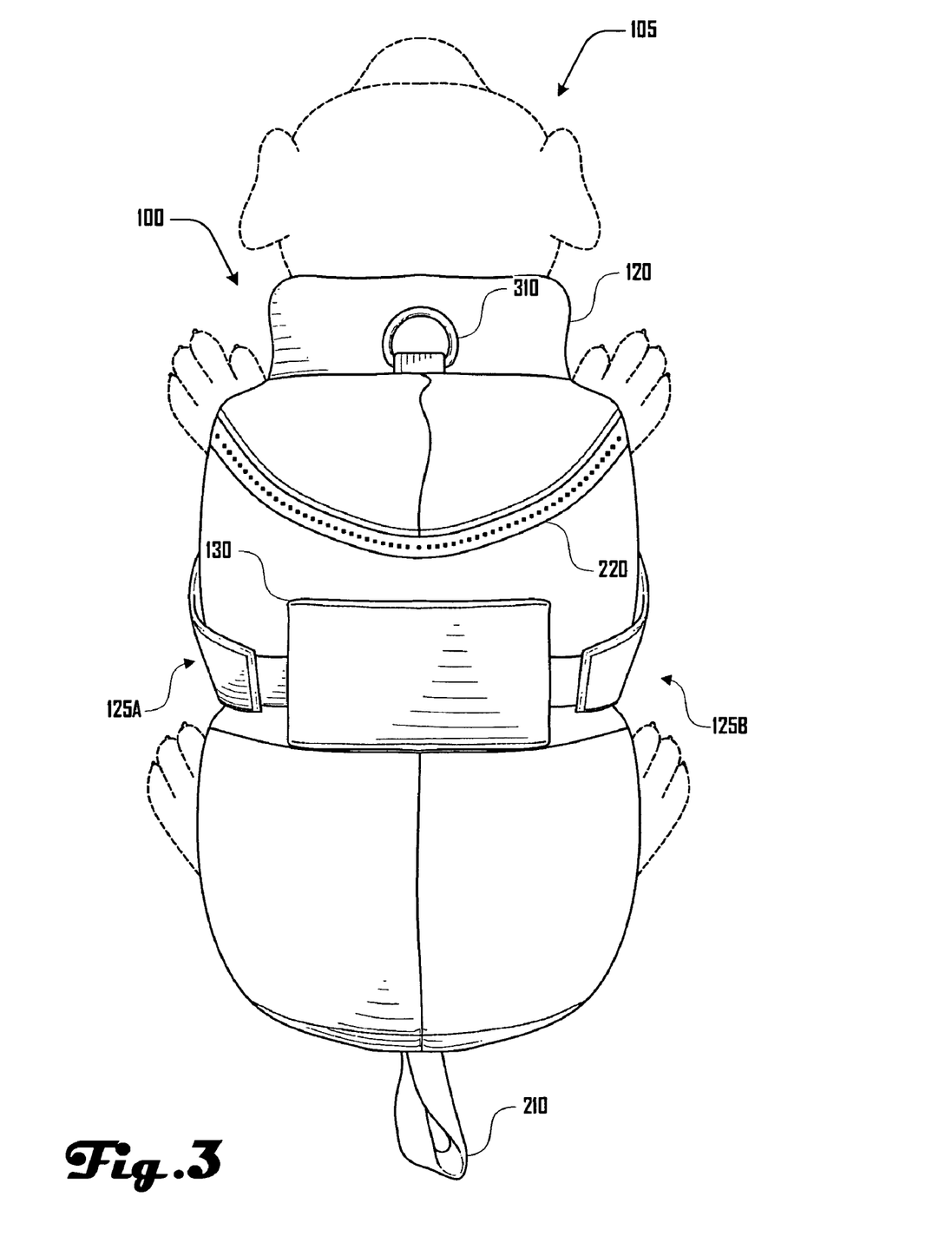
FIG. 3 is a top view of an animal wearing an animal garment, in accordance with various embodiments.

FIG. 3 is a top view of an animal 105 wearing an animal garment 100, in accordance with various embodiments. The animal garment 100 comprises a collar 120, a leash loop 310, a reflective strip 220, a hanging loop 210, a coupling slot 130, and a first and second coupling arm 125A, 125B that couple within the coupling slot 130 may be absent.

As described herein, the animal garment 100 may comprise one or more coupling arm 125A, 125B, which may couple to each other or to a portion of the animal garment 100. For example, in the embodiment depicted in FIG. 3, the first and second coupling arm 125A, 125B extend from a bottom portion of the animal garment 100 and are coupled within the coupling slot 130. In some embodiments, the coupling slot 130.

Additionally, the animal garment 100 may comprise a leash loop 310. In various embodiments, the leash loop 310 may be a ring that is enclosed in a length of material that is coupled to the animal garment 100, which thereby couples the ring to the animal garment 100. In some embodiments, a leash may be connected to the leash loop 310. In one embodiment, there may be a slit or other orifice defined by the animal garment 100 that may provide access to an animal harness or collar worn by an animal 105. For example, many dogs wear a dog harness and if a user desires to connect a leash to the dog harness, there may be a slit, orifice, or opening in the animal garment 100 that provides access to the dog harness such that a leash may be attached to the dog harness. Such a slit, orifice, or opening may comprise structures that allow for closure or covering of the slit, orifice, or opening and such structures may include a hood, hook and loop connector, a zipper, a snap, or the like.

In another embodiment, the animal garment 100 may comprise one or more buoyant member. For example, there may be pockets or slots where buoyant members may be inserted into the animal garment 100 or a buoyant member may be coupled to or enclosed within the animal garment 100. In one embodiment, the animal garment 100 may comprise one or more handle.

In yet another embodiment, the animal garment 100 may comprise one or more weights. For example, in some embodiments, it may be desirable to position weights in the animal garment 100 so as to resist unwanted movement of the animal garment 100 when the animal garment 100 is being worn by an animal 105. In one exemplary embodiment, weights can be positioned in a portion of the animal garment 100 coat that is configured to cover a rear and/or lateral portion of an animal 105.

Figure 4:
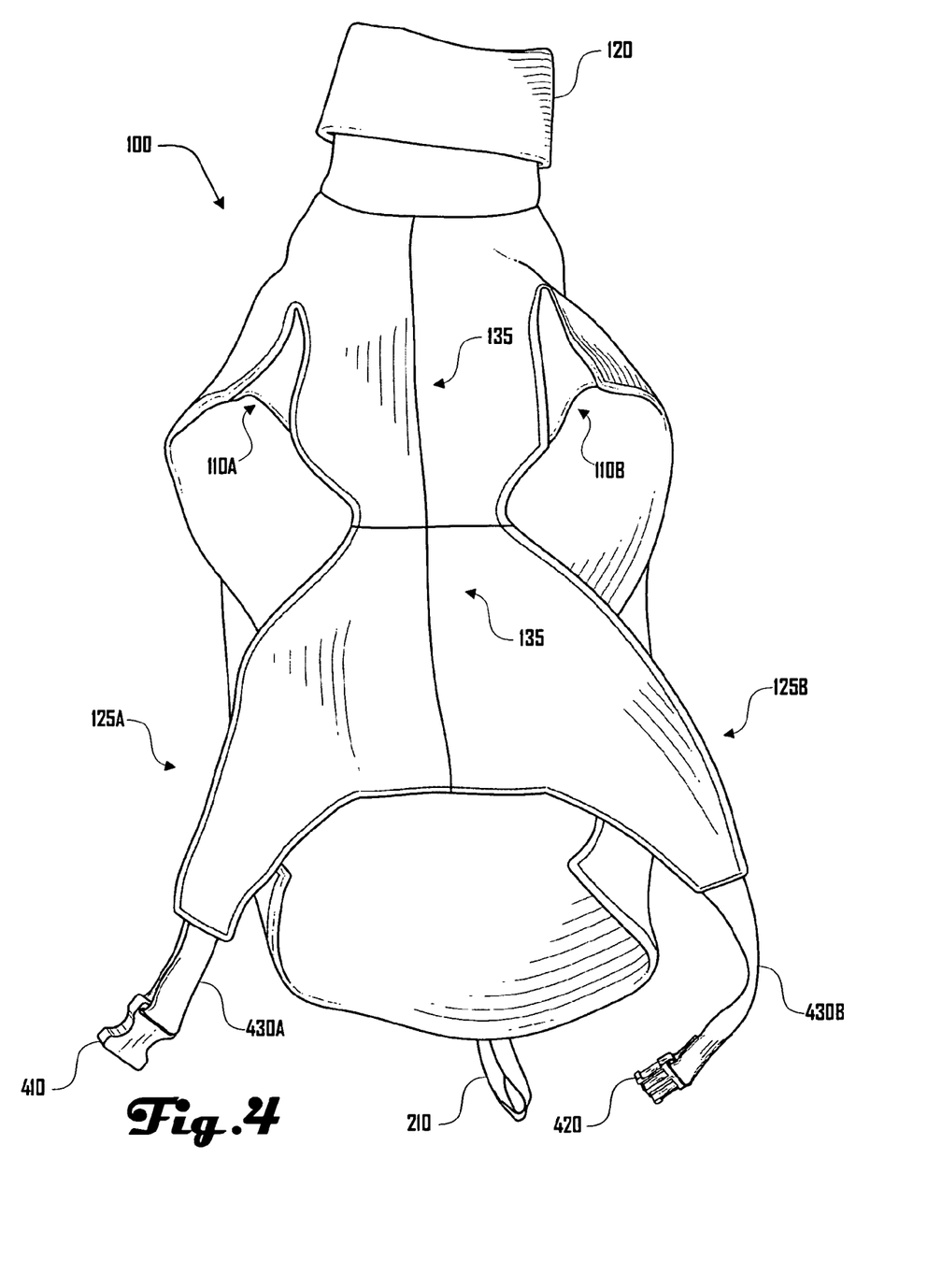
FIG. 4 is a bottom view of an animal garment, in accordance with various embodiments.

FIG. 4 is a bottom view of an animal garment 100, in accordance with various embodiments. The animal garment 100 comprises a first and second front leg insert 110A, 110B, a collar 120, a chest halter portion 135, a hanging loop 210, and a reflective strip 220. The chest halter portion 135 comprises a first and second coupling arm 125A, 125B. The first coupling arm 125A comprises a female coupling clip 410 and a strap 430A. The second coupling arm 125B comprises a male coupling clip 410 and a strap 430B.

The chest halter portion 135, as shown in FIG. 4, may be an extended portion of the animal garment 100 that is positioned on the underside of an animal 105 when the animal garment 100 is worn. Further, the first and second coupling arm 125A, 125B may be configured to be wrapped around the torso of the animal 105 so as to allow the coupling of the male and female coupling clip 410, 420 on or about the back portion of the animal 105. For example, in one embodiment, the first and second coupling arm 125A, 125B may be wrapped around the animal and coupled within a coupling slot 130. In another embodiment, the coupling slot 130 may be absent.

In other embodiments, the chest halter portion 135 may be various other shapes and sizes and comprise one or more coupling arm 125A, 125B, one or more coupling apparatus such as male and/or female coupling clips 410, 420, hook and loop connectors, or the like. In one embodiment, the shape, size and configuration of the chest halter portion 135 may be based on the anatomy, physiology, biomechanics and/or motor learning of an animal 105.

In another embodiment, the animal garment 100 may comprise a temperature regulating, breathable, waterproof and/or water resistant material, which may include Gore-Tex® (W.L. Gore & Associates, Inc., Newark, Del.), eVent® (BHA Group, Inc., Kansas City, Mo.), SympaTex® (Sympatex Technologies, GmbH, Unterfohring, Germany), and the like.

Figure 5:
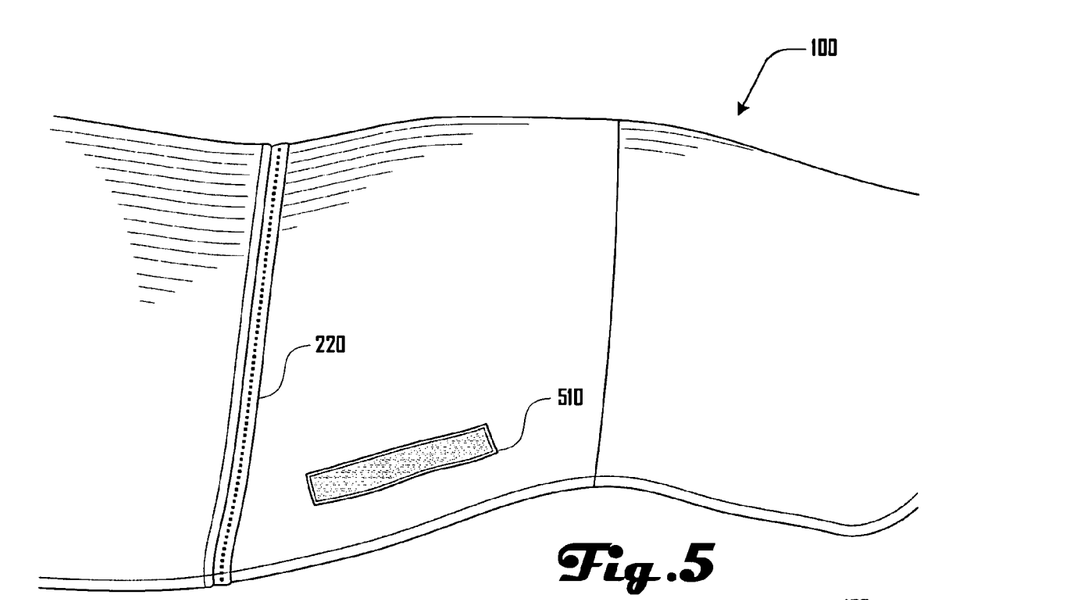
FIG. 5 is a side view of an animal garment, in accordance with various embodiments.

FIG. 5 is a side view of an animal garment 100, in accordance with various embodiments. The animal garment 100 depicted comprises a reflective strip 220 and a lateral hook coupling member 510. As depicted in FIG. 5 is a side view of an animal garment 100 as it may be configured when an animal 105 is wearing the animal garment 100. In one embodiment, there may be a lateral hook coupling member 510 on both sides of the animal garment 100. In a further embodiment, there may be one or more lateral hook coupling member 510 of various sizes positioned in various locations about the animal garment 100. In some embodiments, the lateral hook coupling member 510 may be a length of hook connector such as Velcro®. In other embodiments, there may be a length of hook and/or loop connector located on the animal garment 100.

Figure 6:
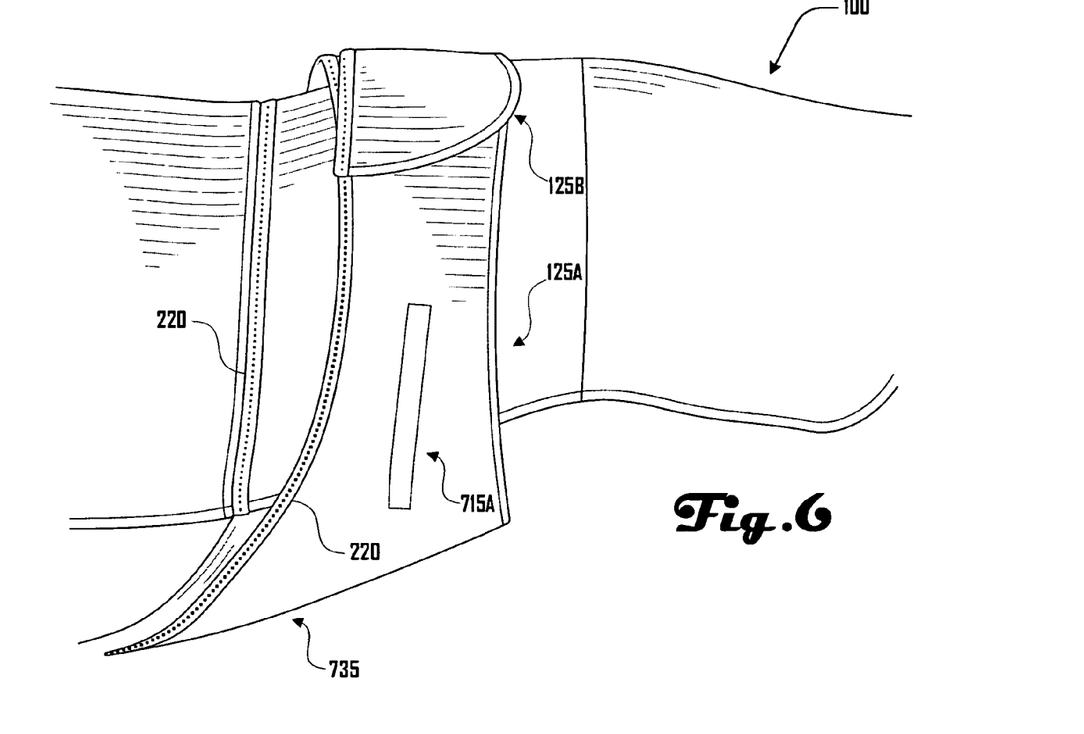
FIG. 6 is a side view of an animal garment, in accordance with various embodiments.

FIG. 6 is a side view of an animal garment 100, in accordance with various embodiments. The animal garment 100 comprises reflective strips 220 and a chest halter portion 135. The chest halter portion 135 further comprises a first and second coupling arm 125A, 125B. The first coupling arm 125A further comprises a lateral loop coupling member 715A.

As shown in FIG. 6, the first and second coupling arm 125A, 125B may be wrapped around a portion of the animal garment 100. The first and second coupling arm 125A, 125B may then be coupled to each other or to a portion of the animal garment 100. For example, the first and second coupling arm 125A, 125B may be coupled to each other via a hook and loop connector, a clip, a snap, a clasp or the like. In another embodiment the first and/or second coupling arm 125A, 125B may be coupled to a portion of the animal garment 100 via a clip, a snap, a clasp or the like.

Additionally, the first and second coupling arm 125A, 125B may also comprise a lateral loop coupling member 715A. FIG. 6 depicts an embodiment, where the lateral loop coupling member 715A is coupled to the surface of the first coupling arm 125A that is opposite to the surfaces shown. Accordingly, the rectangular shape shown in FIG. 6 is simply a perimeter created by the lateral loop coupling member 715A being sewn and thereby coupled to the opposing surface. Accordingly, the lateral loop coupling member 715A is positioned to couple with the lateral hook coupling member 510, which is depicted in FIG. 5.

In some embodiments, the lateral hook coupling member 510 and lateral loop coupling member 715A may be positioned in various configurations such that the lateral hook coupling member 510 and lateral loop coupling member 715A may be coupled when the animal garment 100 is worn by an animal 105. In various embodiments, it may be desirable to allow the lateral hook coupling member 510 and lateral loop coupling member 715A to couple while the animal garment 100 is worn by an animal 105 to reduce unwanted movement, or sliding of the chest halter portion 135, and/or the coupling arms 125A, 125B. In some embodiments, there may be one or more lateral hook coupling member 510 and lateral loop coupling member 715A of various sizes and shapes, and either of the lateral hook coupling member 510 and lateral loop coupling member 715A may be hook or loop releasable connectors, or may be various other types of connectors or releasable connectors.

Figure 7:
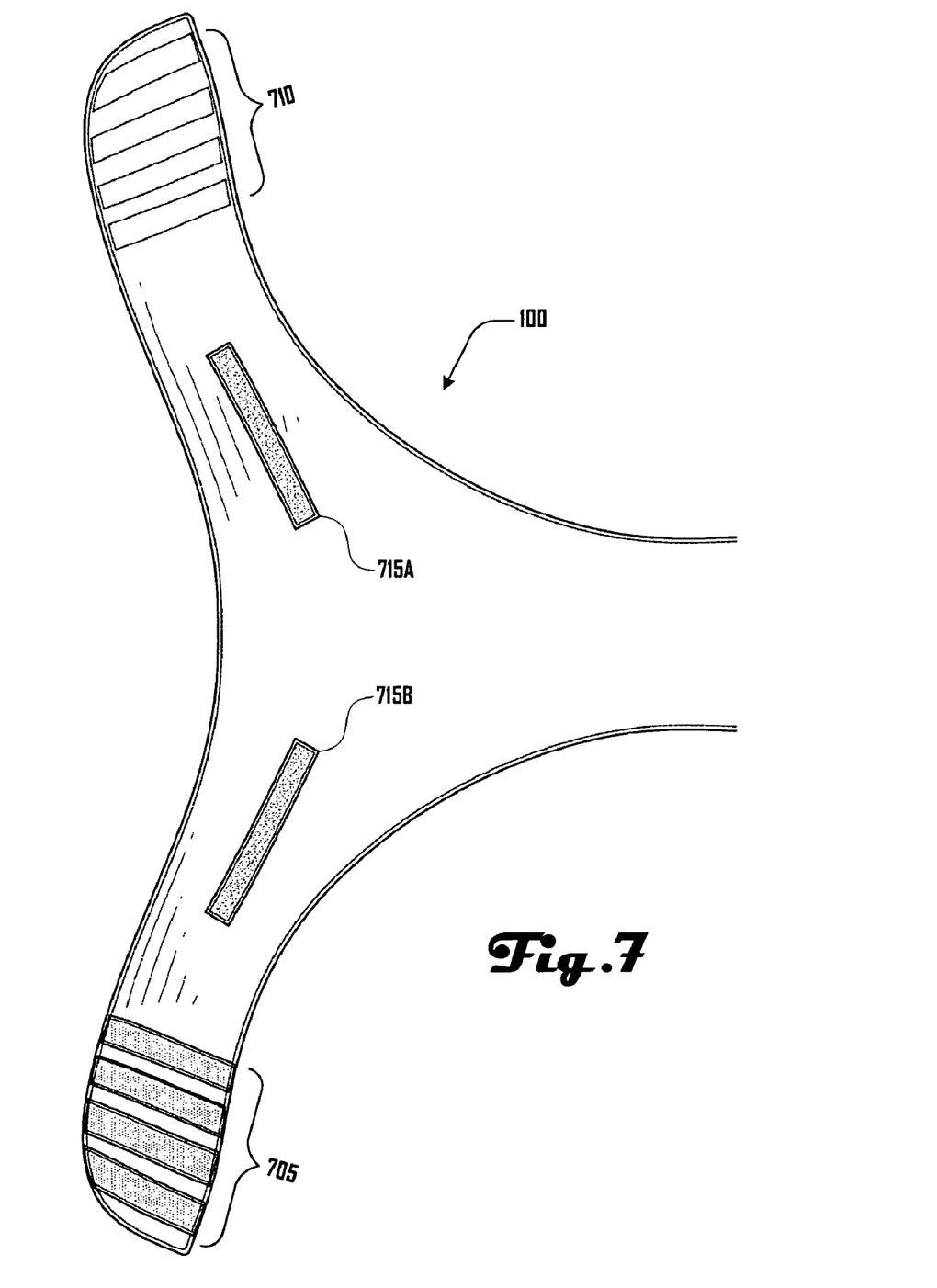
FIG. 7 is a perspective view of a chest halter portion, in accordance with various embodiments.

FIG. 7 is a perspective view of a chest halter portion 135, in accordance with various embodiments. The chest halter portion 135 comprises a coupling arm hook connector 705, a coupling arm loop connector 710, and a first and second lateral loop connector 715A, 715B. As depicted in FIG. 7, the coupling arm hook connector 705 and coupling arm loop connector 710 may comprise an array of hook and/or loop connectors along a length of the chest halter portion 135. Additionally, the coupling arm hook connector 705 and coupling arm loop connector 710 may be positioned on opposing sides of the chest halter portion 135 such that the coupling arm hook connector 705 and coupling arm loop connector 710 may couple when brought together.

In other embodiments, various other types of releasable connectors may be used to serve a similar function. Additionally, it should be clear to one of ordinary skill in the art that the coupling arm hook connector 705 and coupling arm loop connector 710 as depicted in FIG. 7 is simply for purposes of illustration, and that various configurations and arrangements of hook and loop connectors may be used, which are within the scope of various embodiments.

The chest halter portion 135 further comprises a first and second lateral loop connector 715A, 715B, which in some embodiments may comprise a length of hook and/or loop connector. The first and second lateral loop connector 715A, 715B are positioned such that they correspond to the position of one or more lateral hook connector 510. In some embodiments, it may be desirable to facilitate the coupling of the first and second lateral loop connector 715A, 715B and the one or more lateral hook connector 510 so as to reduce undesirable movement or sliding of the chest halter portion 135 when the animal garment 100 is worn by an animal 105.

Figure 8:
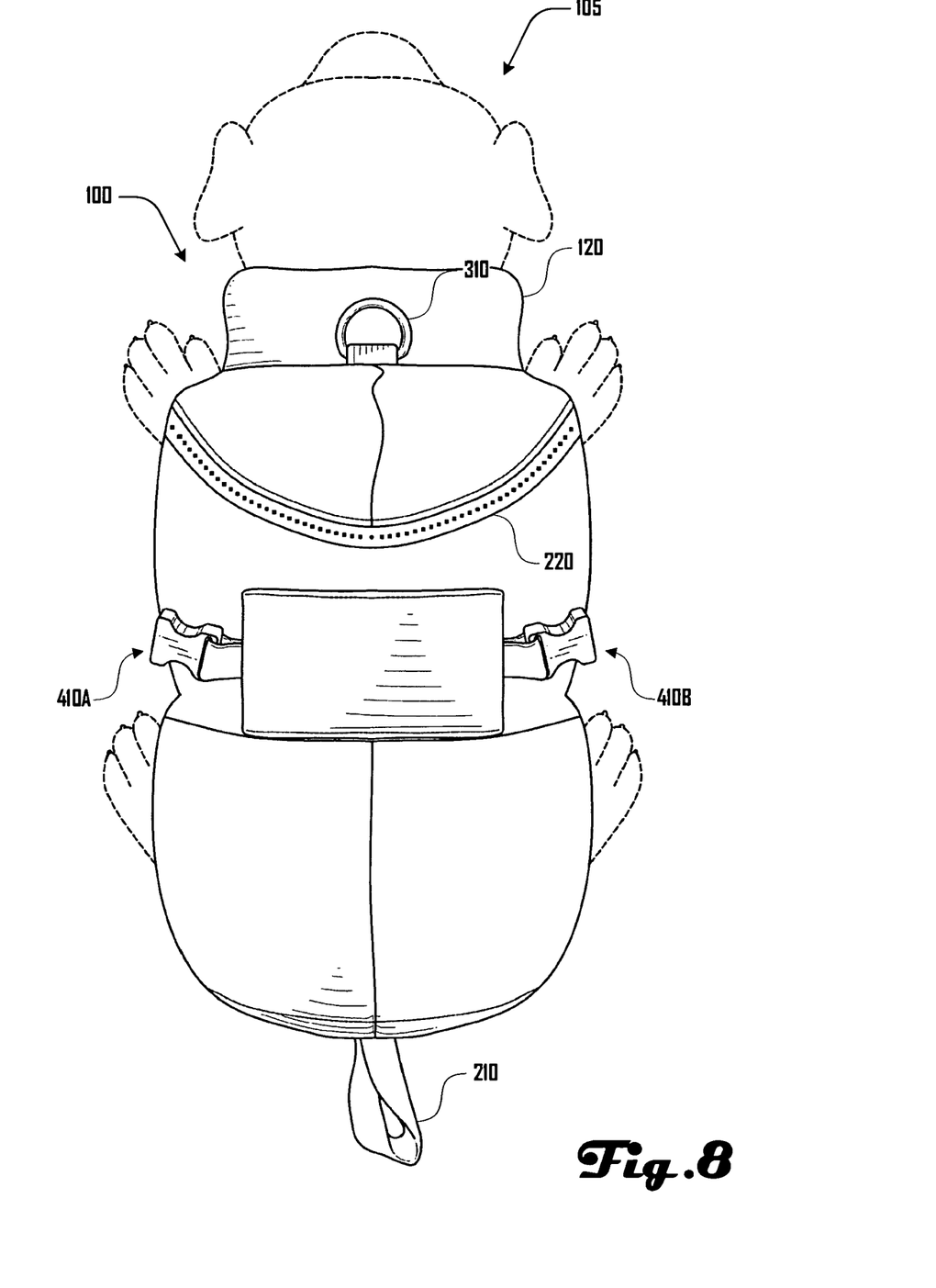
FIG. 8 is a further top view of an animal wearing an animal garment, in accordance with various embodiments.

FIG. 8 is a further top view of an animal 105 wearing an animal garment 100, in accordance with various embodiments. The animal garment 100 comprises a collar 120, a leash loop 310, a reflective strip 220, a hanging loop 210, and a first and second female coupling clip 410A, 410B, which may be coupled to the animal garment 100 via a strap.

As described herein, the animal garment 100 may comprise one or more coupling arm 125A, 125B, which may couple to each other or to a portion of the animal garment 100. For example, in the embodiment depicted in FIG. 7, a first and second coupling arm 125A, 125B may extend from a bottom portion of the animal garment 100 and may be coupled to the first and second female coupling clip 410A, 410B. Accordingly, the first and second coupling arm 125A, 125B may comprise a male coupling clip (see, for example FIG. 4, label 420). In one embodiment, the length of the first and second coupling arm 125A, 125B may be changed such that the fit of the animal garment 100 may be changed, tightened or loosened when worn by an animal 105. In another embodiment, the strap coupling the first and second female coupling clip 410A, 410B may be configurable to change in length such that the fit of the animal garment 100 may be changed, tightened or loosened when worn by an animal 105.

Additionally, although specific embodiments have been illustrated and described herein, it will be appreciated by those of ordinary skill in the art and others, that a wide variety of alternate and/or equivalent implementations may be substituted for the specific embodiment shown in the described without departing from the scope of the embodiments described herein. This application is intended to cover any adaptations or variations of the embodiment discussed herein. While various embodiments have been illustrated and described, as noted above, many changes may be made without departing from the spirit and scope of the embodiments described herein.

The invention claimed is:

1. An animal garment comprising:
   a garment body comprising:
      a stretchable first and second front leg insert, each consisting essentially of a uniformly stretchable planar sheet material, and respectively disposed within a first and second slit defined by the garment body and positioned substantially proximate to a first and second front leg of an animal when the animal garment is worn by said animal;
      a substantially non-stretchable back cover portion comprising a first and second back cover lateral releasable connector;
      a substantially non-stretchable chest halter portion operable to be releasably coupled to said back cover portion and comprising:
      first and second coupling arms that are operable to be coupled about the back cover portion;
      wherein said first coupling arm comprises a first coupling arm lateral releasable connector and said second coupling arm comprises a second coupling arm lateral releasable connector;
      wherein said first and second back cover lateral releasable connectors are positioned approximately parallel to the torso of an animal wearing the garment and positioned on the right and left side of said torso;
      wherein said first and second coupling arm lateral releasable connectors are positioned approximately perpendicular to said first and second back cover lateral releasable connectors when an animal is wearing the garment and said first and second coupling arms are coupled about the back of an animal wearing the garment;
      wherein said first back cover lateral releasable connector is positioned to couple with said first coupling arm lateral releasable connector to limit lateral movement of said coupled first and second coupling arms along the back of an animal wearing the garment;
      wherein said second back cover lateral releasable connector is positioned to couple with said second coupling arm lateral releasable connector to further limit lateral movement of said coupled first and second coupling arms along the back of an animal wearing the garment;
      wherein said first and second back cover lateral releasable connectors comprise a length of at least one of hook connector and loop connector; and
      wherein said first and second coupling arm lateral releasable connectors comprise a length of at least one of hook connector and loop connector; and
   a stretchable chest insert disposed within a slit defined by the garment body and positioned substantially proximate to the chest of an animal when the animal garment is worn by said animal, wherein said stretchable chest insert is narrower at a first end compared to a second end.

2. The animal garment of claim 1, wherein said first and second slit each extend from an interior portion of said garment body to an outer edge of said garment body.

3. The animal garment of claim 2, wherein said leg inserts are substantially triangular and define an edge of said garment.

4. The animal garment of claim, 2 wherein one or more of said first and second coupling arm is adjustable by length.

5. The animal garment of claim 2 wherein said releasable connector comprises a hook and loop connector.

6. The animal garment of claim 5 wherein said first coupling arm comprises a length of hook connector and said second coupling arm comprises a length of loop connector.

7. The animal garment of claim 1, further comprising a coupling cover, which defines a coupling slot and
wherein said first and second coupling arm are coupled within said coupling slot via a releasable connector and
wherein said releasable connector is substantially covered by said coupling cover.

8. The animal garment of claim 1, wherein said first and second stretchable leg insert expand and contract when said animal wearing the animal garment moves said first and second front legs.

9. The animal garment of claim 1 further comprising a stretchable neck insert.

10. The animal garment of claim 1 further comprising a hood.

11. The animal garment of claim 1 further comprising a leash loop.

12. The animal garment of claim 1, wherein said releasable connector comprises a clip.

13. The animal garment of claim 1 wherein said back cover portion comprises at least one of a temperature regulating textile, a breathable textile, a waterproof textile and a water resistant textile.

* * * * *